(12) United States Patent
Durga et al.

(10) Patent No.: US 11,086,761 B2
(45) Date of Patent: Aug. 10, 2021

(54) DEFECT PREDICTION OPERATION

(71) Applicant: DevFactory FZ-LLC, Dubai Media (AE)

(72) Inventors: Ahmedali Durga, Vadodara (IN); Saket Gurukar, Yavatmal (IN)

(73) Assignee: DevFactory Innovations FZ-LLC

( * ) Notice: Subject to any disclaimer, the term of this patent is extended or adjusted under 35 U.S.C. 154(b) by 0 days.

(21) Appl. No.: 15/463,071

(22) Filed: Mar. 20, 2017

(65) Prior Publication Data

US 2018/0267886 A1 Sep. 20, 2018

(51) Int. Cl.
| | | |
|---|---|---|
| G06F 11/36 | (2006.01) | |
| G06N 20/00 | (2019.01) | |
| G06F 11/00 | (2006.01) | |
| G06N 20/10 | (2019.01) | |

(52) U.S. Cl.
CPC ........ *G06F 11/3668* (2013.01); *G06F 11/008* (2013.01); *G06F 11/3604* (2013.01); *G06F 11/3616* (2013.01); *G06N 20/00* (2019.01); *G06N 20/10* (2019.01)

(58) Field of Classification Search
CPC .......................... G06F 11/3668; G06N 99/005
USPC ........................................................ 717/131
See application file for complete search history.

(56) References Cited

U.S. PATENT DOCUMENTS

| | | |
|---|---|---|
| 7,617,415 B1 | 11/2009 | Kadakia |
| 8,881,095 B1 | 11/2014 | Hunt, Jr. et al. |
| 2008/0271006 A1 | 10/2008 | Nagappan et al. |
| 2012/0317058 A1* | 12/2012 | Abhulimen .......... G06N 99/005 706/2 |
| 2014/0033176 A1* | 1/2014 | Rama ................... G06F 11/3688 717/124 |
| 2015/0112903 A1* | 4/2015 | Chan ................. G06F 17/30961 706/12 |

(Continued)

FOREIGN PATENT DOCUMENTS

WO 2009089294 A2 7/2009

OTHER PUBLICATIONS

N. E. Fenton and M. Neil, "A critique of software defect prediction models," in IEEE Transactions on Software Engineering, vol. 25, No. 5, pp. 675-689, Sep.-Oct. 1999 (Year: 1999).*

(Continued)

*Primary Examiner* — James D. Rutten
(74) *Attorney, Agent, or Firm* — Terrile, Cannatti & Chambers, LLP (57) ABSTRACT

A system, method, and computer-readable medium are disclosed for predicting a defect within a computer program comprising: accessing a code base of the computer program, the code base of the computer program comprising a plurality of computer program files; training the defect prediction system, the training including performing a historical analysis of defect occurrence patterns in the code base of the computer program; analyzing a commit of the computer program to identify a likelihood of defect occurrence within each of the plurality of files of the computer program; and, calculating a defect prediction metric for each of the plurality of files of the computer program, the defect prediction metric providing an objective measure of defect prediction for each of the plurality of files of the computer program.

24 Claims, 6 Drawing Sheets

(56) References Cited

U.S. PATENT DOCUMENTS

2016/0239402 A1* 8/2016 Zieder .................. G06F 8/60

OTHER PUBLICATIONS

"Exponential Decay", Jan. 17, 2016, Wikipedia, accessed online at <web.archive.org/web/20160117011547/https://en.wikipedia.org/wiki/Exponential_decay> (Year: 2016).*
Graves et al., "Predicting Fault Incidence Using Software Change History", Jul. 2000, IEEE Transactions on Software Engineering, vol. 26, No. 7, pp. 653-661 (Year: 2000).*
Mockus et al., "Predicting Risk of Software Changes", Aug. 2002, Bell Labs Technical Journal, vol. 5, No. 2, pp. 169-180 (Year: 2002).*
G. G. Cabral, L. L. Minku, E. Shihab and S. Mujahid, "Class Imbalance Evolution and Verification Latency in Just-in-Time Software Defect Prediction," 2019 IEEE/ACM 41st International Conference on Software Engineering (ICSE), Montreal, QC, Canada, 2019, pp. 666-676, doi: 10.1109/ICSE.2019.00076. (Year: 2019).*
Alex J. Smola et al., A Tutorial on Support Vector Regression, Statistics and Computing 14: 199-222, 2004.
Jez Humble et al, Continuous Delivery: Anatomy of the Deployment Pipeline, The Commit Stage (p. 4) informIT.com, Sep. 7, 2010.
Sunghun Kim, Adaptive Bug Prediction by Analyzing Project History, Dissertation, Sep. 2006, pp. 1-145, University of California at Santa Cruz, Santa Cruz, California.
Written Opinion of the International Searching Authority, PCT/US2018/023433, dated Mar. 20, 2018, pp. 1-8.
International Search Report mailed in PCT/US2018/023433 dated Jun. 15, 2018, pp. 1-6.

* cited by examiner

DEFECT PREDICTION OPERATION

BACKGROUND OF THE INVENTION

Field of the Invention

The present invention relates to information processing systems. More specifically, embodiments of the invention relate to performing defect prediction operations using information processing systems.

Description of the Related Art

It is known to use information processing systems to perform software testing operations. A software testing operation validates and verifies that a computer program or application functions as expected and/or meets the requirements that guided the design and development of the software application. A software testing operation can be implemented at any time in the development process, but typically occurs after the requirements of the computer program have been defined and the coding process has been completed. Software testing operations often result in the identification of defects in the computer program to allow the defects to be corrected before the computer program is released to users.

A defect describes an error, failure, or fault in a computer program or system that produces an incorrect or unexpected result, or causes the computer program to behave in unintended ways. Many defects arise from mistakes made in either development of the source code of the computer program or in the design of the computer program. Defects can trigger errors that in turn can have a wide variety of effects with varying levels of inconvenience to the user of the program.

It is known to perform software testing operations via a test suite that when applied to a computer program supposedly ensures that the product functions as expected. However, it has been observed that test suites can be non-exhaustive and that computer program developers generally tend to bypass writing additional tests unless explicitly required to do so.

SUMMARY OF THE INVENTION

A system, method, and computer-readable medium are disclosed for predicting a defect within a computer program comprising: accessing a code base of the computer program, the code base of the computer program comprising a plurality of computer program files; training the defect prediction system, the training including performing a historical analysis of defect occurrence patterns in the code base of the computer program; analyzing a commit of the computer program to identify a likelihood of defect occurrence within each of the plurality of files of the computer program; and, calculating a defect prediction metric for each of the plurality of files of the computer program, the defect prediction metric providing an objective measure of defect prediction for each of the plurality of files of the computer program.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various aspects of this disclosure include a recognition that an issue relating to computer programs relates to determining when to release a new version of the computer program. It would accordingly be desirable to provide assistance in making this decision in an informed and data-backed way. In various embodiments, the defect prediction operation of the present disclosure provides a methodology where given a commit or a plurality of commits, a prediction may be generated showing for example a number of days before a given file will likely see a defect reported. In various embodiments, the defect prediction operation provides recommendations for corrective actions that can and/or should be taken to mitigate risk associated with the defect predictions.

In certain embodiments, the predictions and recommendations are based on historical analysis of defect occurrence patterns in the code base of the computer program. Various aspects of the disclosure include a recognition that the urgency of the feature or other changes can bias a product owner's judgment on whether to proceed with releasing a new version of the computer program. Accordingly, various aspects of the disclosure include an appreciation that it would be desirable to provide an objective measure of defect prediction.

Various aspects of the disclosed defect prediction operation provides an objective measure of defect prediction. In various embodiments, the objective measure is further refined to provide an objective measure for a particular commit and/or change for a computer program. In various embodiments, the objective measure of defect prediction includes a metric which provides an indication of a predicted interval in which the next defect occurrence can be expected. In various embodiments, the defect prediction operation includes uses an algorithm to leverage a defect occurrence history of a code base and to generate a prediction for next defect occurrence interval. This prediction can be used to prioritize code review activity. The prediction can also be used to determine whether to enforce extensive testing for high-risk files. In certain embodiments, high risk files include those files with smallest relative predicted interval to next defect.

In various embodiments, the defect prediction system further includes a defect prediction user interface. In certain embodiments, the defect prediction user interface presents a dashboard which intuitively provides information to a user regarding files at the greatest risk for defect occurrence. In various embodiments, the dashboard presents information across all file check-ins. Such a dashboard provides a convenient representation for identifying the files that may be desirable to be subjected to additional review and/or testing.

Figure 1:
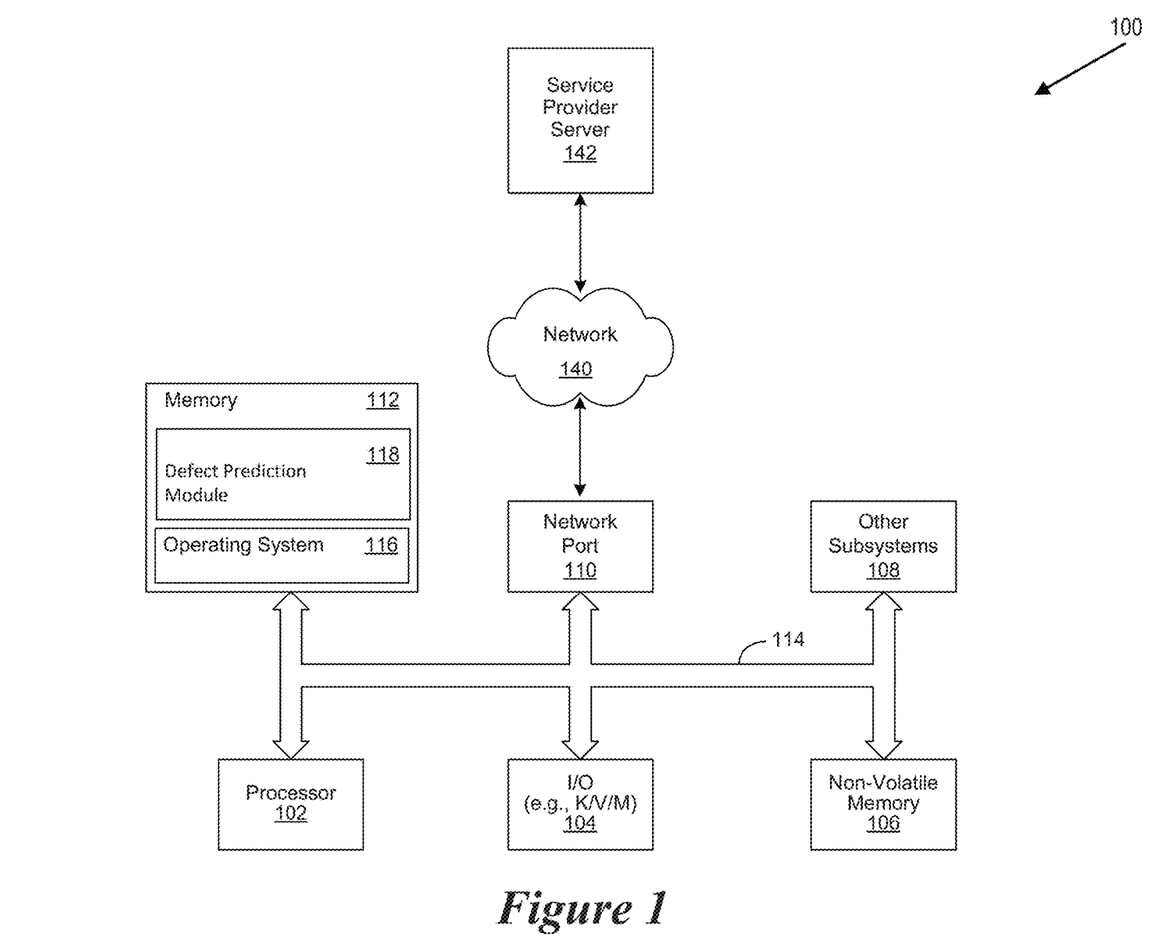
FIG. 1 shows a generalized block diagram of an information processing system.

FIG. 1 is a generalized illustration of an information processing system 100 that can be used to implement the system and method of the present invention. The information processing system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information processing system 100 also includes network port 110 operable to connect to a network 140, which is likewise accessible by a service provider server 142. The information processing system 100 likewise includes system memory 112, which is interconnected to the foregoing via one or more buses 114. System memory 112 further comprises operating system (OS) 116 and in various embodiments may also comprise a defect prediction module 118.

The defect prediction module 118 performs a defect prediction operation. In certain embodiments, the defect prediction operation is performed via a defect prediction system. In various embodiments, the defect prediction operation provides a methodology where given a commit or a plurality of commits, a prediction may be generated showing for example a number of days before a given file will likely see a defect reported. For the purposes of this disclosure, a commit may be defined as a set of computer program files which have completed a commit stage of a software development pipeline. The commit represents a file or set of files of a computer program which represents a release candidate for that file or set of files. In various embodiments, the commit stage can include one or more of a plurality of steps including compiling the code of the file or set of files if necessary, running a set of commit tests on the file or set of files, creating binaries of the file or set of files for use by later stages of the development pipeline, performing analysis of the code of the file or set of files and preparing artifacts, such as test databases, for use by later stages of the development pipeline. In certain embodiments, the defect prediction operation is performed as part of step of performing analysis of the code of the computer program.

In various embodiments, the defect prediction operation provides recommendations for corrective actions that can and/or should be taken to mitigate risk associated with the defect predictions. In certain embodiments, the predictions and recommendations provided by the defect prediction operation are based on historical analysis of defect occurrence patterns in the code base of the computer program. In certain embodiments, the defect prediction operation provides an objective measure of defect prediction. In various embodiments, the objective measure is further refined to provide an objective measure for a particular commit and/or change for a computer program. In various embodiments, the objective measure of defect prediction includes a metric which provides an indication of a predicted interval in which the next defect occurrence can be expected. In various embodiments, the defect prediction operation includes uses an algorithm to leverage a defect occurrence history of a code base and to generate a prediction for next defect occurrence interval. This prediction can be used to prioritize code review activity. The prediction can also be used to determine whether to enforce extensive testing for high-risk files. In certain embodiments, high risk files include those files with smallest relative predicted interval to next defect.

In various embodiments, the defect prediction system further includes a defect prediction user interface. In certain embodiments, the defect prediction user interface presents a dashboard which intuitively provides information to a user regarding files at the greatest risk for defect occurrence. In various embodiments, the dashboard presents information across all file check-ins. In certain embodiments a check-in is a step in the development pipeline where a developer commits a file to a version control system for the computer program. Such a dashboard provides a convenient representation for identifying the files that may be desirable to be subjected to additional review and/or testing.

Figure 2:
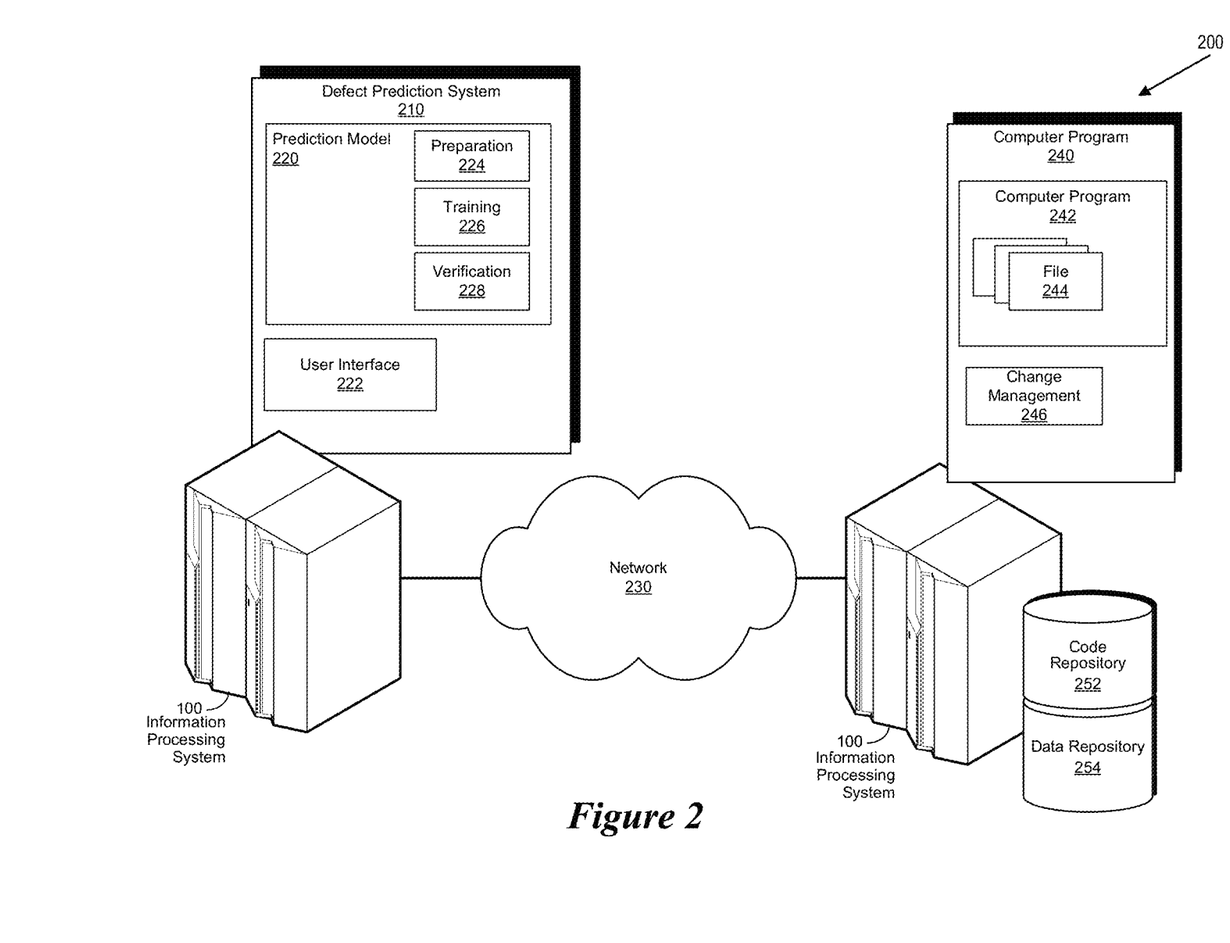
FIG. 2 shows a block diagram of a defect prediction environment for performing defect prediction operations.

FIG. 2 shows a block diagram of a defect prediction environment 200 for performing defect prediction operations in accordance with embodiments of the invention. In various embodiments, the defect prediction environment 200 includes a defect prediction system 210. The defect prediction system 210 further includes a prediction model system 220 as well as a user interface system 222. The prediction model system 220 includes a preparation module 224, a training module 226 and a verification module 228. Some or all of the functions of the defect prediction system 210 may be performed via the defect prediction module 118.

The defect prediction environment 200 further includes a network 230, which may be a private network, a public network, a local or wide area network, the Internet, combinations of the same, or the like. In various embodiments, the network 140 is included within the network 230. In various embodiment, the defect prediction environment 200 also includes a computer program portion 240. The computer program portion 240 includes a computer program 242 which includes a plurality of files 244. In certain embodiments, the computer program 242 includes the source code for the computer program. In certain embodiments, the computer program portion 240 also includes a version control system 246. Either or both the defect prediction system 210 or the computer program portion 240 may reside within and execute on one or more information processing systems 100. In various embodiments, the defect prediction environment includes a code repository 252 as well as a data repository 254. In various embodiments, the code repository 252 and the data repository 254 store some or all of the information used by the defect prediction system 210 and the computer program portion 240. For example, in certain embodiments, the code repository 252 stores a code base of the computer program. In certain embodiments, the code base of the computer program comprises a plurality of computer program files for the computer program.

As disclosed in greater detail herein, the preparation module 224 performs a preparation phase operation during which an initial risk scored is computed. As disclosed in greater detail herein, the training module 226 performs a training phase operation during which an initial defect prediction model is built. As disclosed in greater detail herein, the verification module 228 performs a verification phase operation during which the defect prediction model is verified.

The user interface system 222 of the defect prediction system 210 provides information to a user regarding the defect prediction. For example, in certain embodiments the user interface provides information regarding defect prediction on a file by file basis. In certain embodiments, the user interface system 222 presents a dashboard which intuitively provides information to a user regarding files at the greatest risk for defect occurrence. In various embodiments, the dashboard presents information across all file check-ins. Such a dashboard provides a convenient representation for identifying the files that may be desirable to be subjected to additional review and/or testing.

In certain embodiments, the computer program 242 comprises the source code for an enterprise software development application. Committing such an enterprise software development application can be the culmination of many months of development with many lines of code written and modified.

In various embodiments, the network 230 may be a public network, such as the Internet, a physical private network, a virtual private network (VPN), a wireless network, or any combination thereof. In certain embodiments, the wireless network may be a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on existing third generation (3G) wireless technologies including universal mobile telecommunications system (UMTS) and wideband code division multiple access (W-CDMA).

In certain embodiments, a defect propensity metric is generated for each of the files 244 of computer program 242. The defect propensity metric provides an objective measure of how risky a file is (i.e., of how likely a file is to have a defect). In certain embodiments, the defect propensity metric is generated as:

$$Risk = 100 * \Sigma_{c=1}^{n} 1/(1+e^{(-12t_c+12)})$$

Where

Risk represents an objective measure of how risky a file is;

n represents a number of bug-fix commits for a particular repository;

$t_c$ is the normalized timestamp of $c^{th}$ commit (t=0 for earliest commit and t=1 for latest commit); and, 100 is a convenience factor.

In certain embodiments, a repository is a source control system such as a git distributed version control system to which the source code is committed. Effectively, the defect propensity metric for a file is calculated based upon a plurality of criteria. In certain embodiments, the plurality of criteria include: how frequently does the file appear in a defect ridden commit (i.e., buggy commit) where the higher the number of times a file appears in a buggy commit, the higher the risk is for that file and how recently did the defect ridden commit occur. Thus, the defect propensity metric provides an objective indication which highly corresponds to and confirms an intuitive deduction of a highly skilled computer programmer.

In certain embodiments, the defect prediction system 210 when performing the historical analysis of defect occurrence, the defect prediction system 210 uses a defect classification operation. In certain embodiments, the historical analysis identifies the number of bug-fix commits a particular file has. In certain embodiments, the defect classification operation uses a defect classification tool which generates insights for a particular repository such as classifying the commits into features, defect fixes, configurations, etc.

In certain embodiments, the defect prediction model is based on a plurality of quantifiable factors. More specifically, in certain embodiments, the defect prediction model is based on a risk value (which in certain embodiments may be derived from the defect propensity metric) and a time value representing a time after which a defect occurs in a file having a particular risk value. Based upon an analysis of a large number (e.g., more than 300) open source computer programs, a relationship between the risk value and the time value has been determined. More specifically, referring to FIG. 3 a chart representing the relationship between the risk value and the time value for an example computer program 242 is shown.

Figure 3:
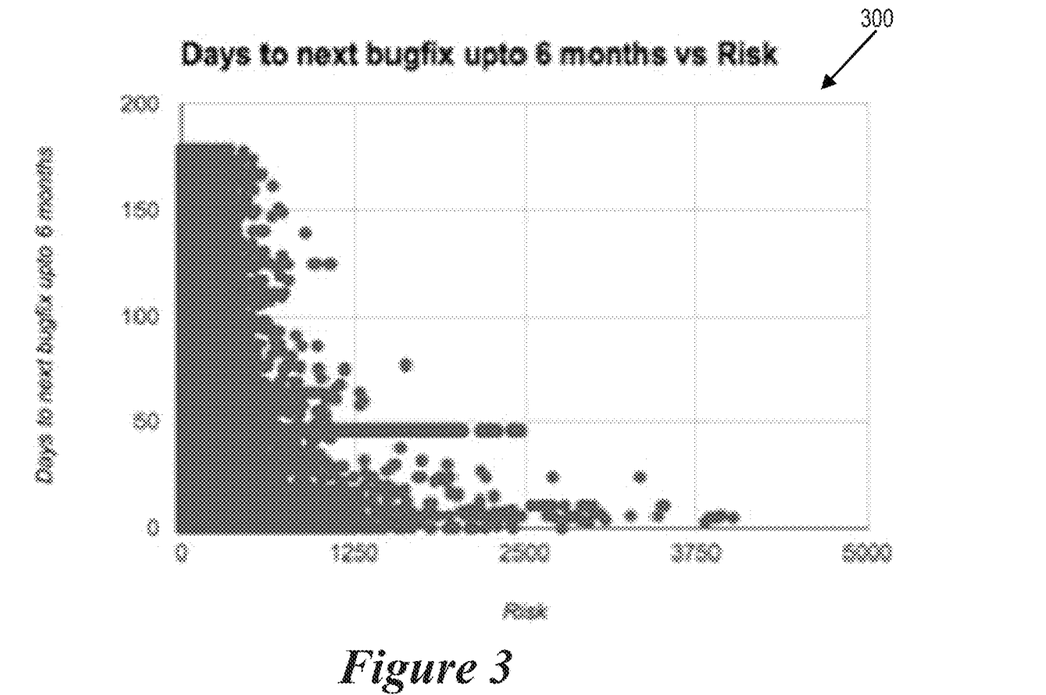
FIG. 3 shows a chart representing a relationship between a risk value and a time value for an example computer program.

The relation is shown in diagram in FIG. 3. For example, as shown by the example represented in FIG. 3, for a particular commit of a computer program 242 there are a relatively large number (e.g., hundreds) of low risk commit files which have a risk value below 1250. Additionally, with the low risk commit files, the possible quantification of risk (e.g., days to next bugfix) varies significantly (e.g., by more than 25%). For the purposes of the present disclosure, the low risk files are not considered as important as the likelihood of one of the low risk files causing an issue which could result in not being able to release the computer program 242 is relatively low (e.g., less than 25%). In this example, high risk files are those files whose risk value is above 1250. These high risk files are used to identify trends relating to defects and thus are considered as important when generating a defect prediction metric. It will be appreciated that the risk value can vary from computer program to computer program. In certain embodiments, the risk value is repository specific. For example, the risk value may vary from version to version of the computer program stored within a repository.

It has been empirically determined based upon an analysis of a large number of software development projects (e.g., more than 300 software development projects), that as the risk metric of a file increases the number of days after which a defect will likely appear in that particular file decreases. I.e., the relation between the risk metric and the number of days after which a defect will likely occur can be represented as an exponential decay. This recognition enables development of a defect prediction model which advantageously provides a metric for predicting future possible defect occurrences relating to a particular file.

An insight derived from this empirical analysis is that for a risk value above a certain amount (in the previous example the certain amount was set as 1250), there exists a relationship between two factors. In certain embodiments, the plurality of factors include one or more of the risk and the next defect occurred day. In certain embodiments, the plurality of factors can include a fit value which represents fitting of a higher order polynomial curve to the data and determining a threshold based upon the fitting. This given risk value is referred to as the risk threshold.

Additionally, the risk prediction operation recognizes that the semantics of a risk score can vary from project to project. For example, for a particular project (e.g., Project A) a risk score of 1000 has different consequences (in terms of days to next bug fix) as compared to same risk score of 1000 in project B. Thus, the risk threshold of Project A can be different to that of Project B. Accordingly, the risk prediction operation determines a risk threshold for each project. In certain embodiments, the risk threshold is determined dynamically for every project on which the risk prediction operation is performed.

Figure 4:
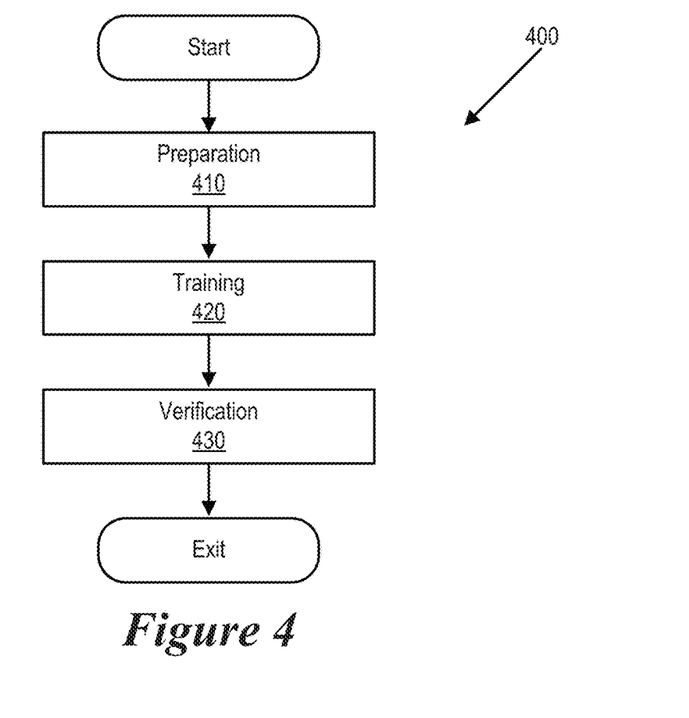
FIG. 4 shows a flow chart of a defect prediction operation.

Referring to FIG. 4, a flow chart of a defect prediction operation 400 is shown. More specifically, the defect prediction operation 400 includes a preparation phase operation 410, a training phase operation 420 and a verification phase operation 430. In certain embodiments, the preparation phase operation 410 is performed by the preparation module 224, the training phase operation 420 is performed by the training module 226 and the verification phase operation 430 is performed by the verification module 228.

In certain embodiments, whenever a commit occurs, the defect prediction operation 400 calculates a risk metric for each of the files included in the commit. In certain embodiments, the risk metric provides an objective measure for quantifying a prediction of a risk of a file having a defect. In certain embodiments the risk metric represents a predicted amount of time before a defect might occur. In certain embodiments, the predicted amount of time is quantified as a number of days before a defect after which a defect will likely occur in the particular file. In certain embodiments, the risk metric is calculated using a linear regression operation.

During the preparation phase operation 410, the preparation module 224 constructs a commit history to enable computation of computing a risk score. In certain embodiments, a risk threshold value of 20 is selected for this phase. During the training phase operation 420, the training module 226 considers all the commits not present in the preparation phase operation 410 and the verification phase operation 430 for building a first defect prediction model (i.e., Model 1). The training module 226 uses the first defect prediction model to make predictions for commit files during the verification phase operation 430.

More specifically, in certain embodiments the training module 226 performs a linear regression operation to build a linear regression model representing the first defect prediction model.

Figure 5:
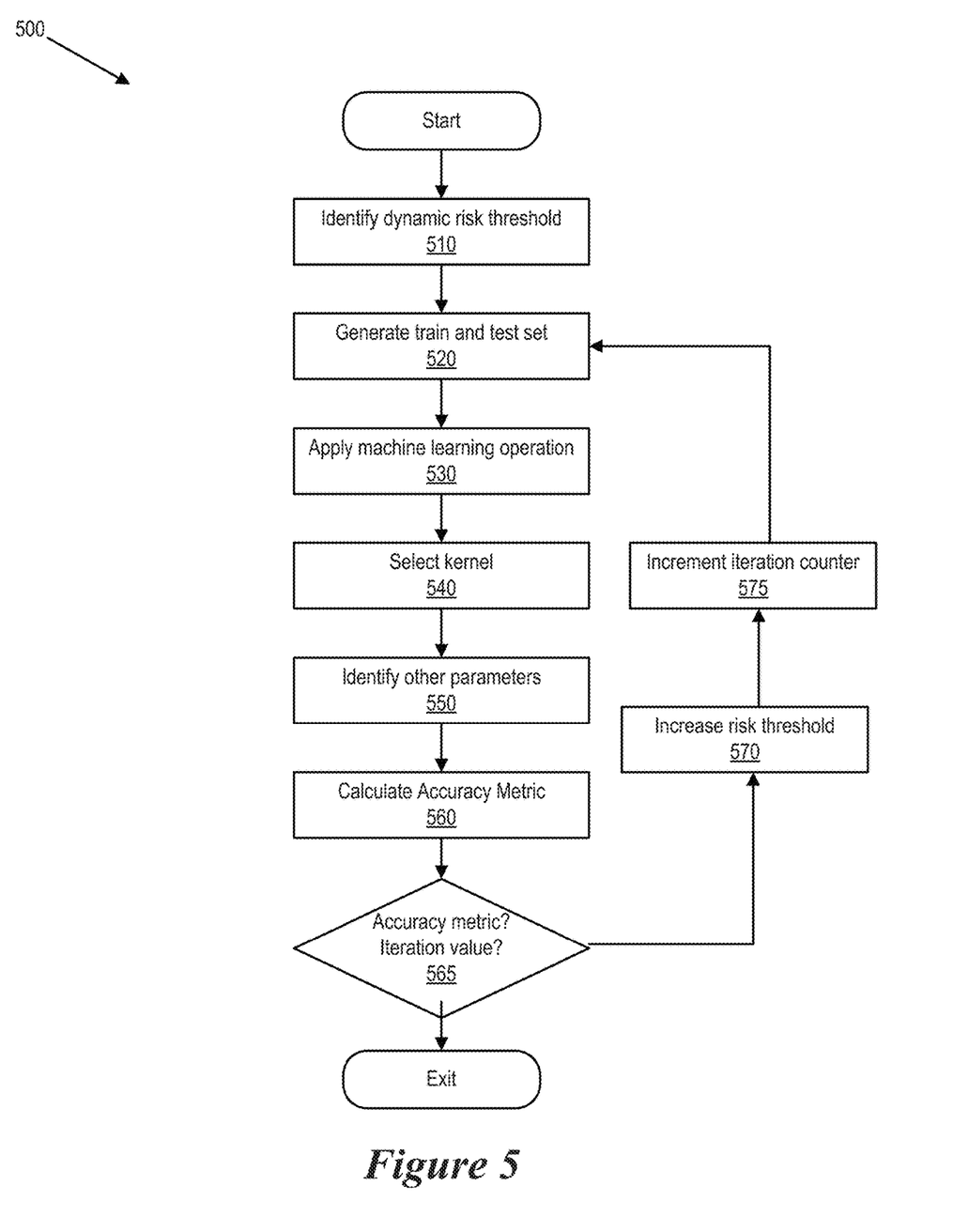
FIG. 5 shows a flow chart of a defect prediction type linear regression operation.

Referring to FIG. 5, a flow chart of a linear regression operation 500 is shown. More specifically, the linear regression operation 500 begins at step 510 by identifying a dynamic risk threshold for the project. Next, at step 520, the training module 226 generates a train and test set for a given data set. The train and test set includes only those data points having a risk metric that is no less than the identified dynamic risk threshold. Next, at step 530, a machine learning operation is applied to the train and test set to provide a defect prediction metric. In certain embodiments, the machine learning operation comprises a support vector regression operation.

Next, at step 540, a kernel is selected for which the support vector regression operation is to be performed. The kernel which is selected is identified as a Radial Basis function (rbf) kernel. This kernel is used to perform kernelized learning functions such as a support vector machine classification learning function. The kernel corresponds to a similarity of data points in a dataset. Next, at step 550, other parameters of the support vector regression operation are identified. In certain embodiments, the other parameters may include one or more of a penalty parameter, a degree of polynomial kernel function parameters, a kernel coefficient parameter, an epsilon in an epsilon-SVR model parameter, an independent term in kernel function parameter, an indication of whether to use a shrinking heuristic parameter, a tolerance for stopping criterion parameter, a cache size parameter and a hard limit on iterations parameter. In certain embodiments, the other parameters are identified via a parameter estimation operation. In certain embodiments, the parameter estimation operation is based on either or both the penalty parameter and the epsilon in an epsilon-SVR model parameter. In certain embodiments, the optimization operation is performed using a machine learning parameter estimation tool such as the GridSearchCV tool.

Next, at step 560, an accuracy metric is calculated for the selected kernel. Next, at step 565, the accuracy metric is analyzed to determine whether the accuracy metric is below a desired accuracy value and an iteration value is analyzed to determine whether the iteration value is below a predetermined iteration value (indicating that the linear regression operation has performed fewer than a predetermined number of iterations). If both the accuracy metric is below the accuracy value and the iteration value is below the predetermined iteration value, then the dynamic risk threshold is increased by a small amount (e.g., by 2) at step 570, an iteration counter is incremented at step 575 and the linear regression operation 500 returns to step 520. If the accuracy metric is at or above a desired accuracy value or the iteration metric equals the predetermined iteration value then the linear regression operation 500 completes.

In certain embodiments, the dynamic risk threshold is calculated taking into account a plurality of factors. In certain embodiments, the plurality of factors include one or more of the risk and the next defect occurred day and fit. The dynamic risk threshold is then calculated by applying a higher order polynomial curve to the plurality of factors. Afterwards, a risk value is identified for a particular value of "next bug occurred day" from the curve. In certain embodiments, the risk value is set to 30 days, as such a risk value provides a defect prediction for a file in which a defect is likely to occur within a month of the release of the file.

Based on a specific dynamic risk threshold, a build convergence model is generated. The build convergence model is analyzed to determine whether the accuracy of the build convergence model below a specified threshold. In certain embodiments, if the build convergence model is below the specified threshold, the dynamic risk threshold is increased. In certain embodiments, increasing dynamic risk threshold results in an increase in the accuracy of build convergence model. However, in certain embodiments, an increase in the dynamic risk threshold can lead to a less than desirable number (e.g., fewer than 100) of training data points. With this condition, the defect prediction system 210 might generate and a message (e.g., a message setting forth that the defect prediction system has an insufficient amount of data to build a defect prediction model).

In certain embodiments, the defect prediction system 210 determines the accuracy of the defect prediction model based on an upper bound value. In certain embodiments, the accuracy of the defect prediction model is used to indicate whether an actual defect occurs within a file when the defect prediction metric indicated that it would. For example, if the defect prediction metric indicates that a defect will occur in a particular file in a month and an actual defect does occur in the file within a month, then the defect prediction metric is correct and the accuracy of the model using the defect prediction metric is increased. If an actual defect does not occur within the amount of time prescribed by the defect prediction metric then the defect prediction metric is incorrect and the accuracy of the model is decreased.

In certain embodiments, the defect prediction system 210 determines the accuracy of defect prediction model based on an interval way based accuracy calculation. For example, if the defect prediction metric predicted a defect to a file to occur between 15 to 30 days and an actual defect occurs on day 7 then also the prediction is incorrect. In certain embodiments, the accuracy calculation uses an upper bound based accuracy calculation. In certain embodiments, the accuracy value is used internally to further enhance the performance and accuracy of the defect prediction.

In certain embodiments, the verification phase operation 430 uses commits which are present in a predetermined amount of time (e.g., the last 6 months) of the project. The model that is generated during the training operation (e.g., Model 1) is used to make defect predictions on commits in the verification operation for next occurrence of defect. In certain embodiments, the accuracy of the defect prediction model when performing the verification operation is reported via a user interface.

In certain embodiments, the defect prediction system 210 continuously learns and adapts to new changes of computer program code being analyzed. In certain embodiments, after a sufficient number of commits (e.g., 5 commits) are analyzed during the verification phase operation 430, the defect prediction system uses the analyzed commits (commits C1) to as inputs to defect prediction model and a new defect prediction model (Model 2) is generated. The defect prediction system 210 then includes information derived from the analyzed commits when performing a defect prediction operation on commits that are released after the C1 commits (i.e., the new defect prediction model is used when performing the defect prediction operation on commits after the C1 commits).

In certain embodiments, the defect prediction system 210 analyzes the accuracy of the new defect prediction model to determine whether the accuracy of the new defect prediction model is better than the accuracy of the first defect prediction model. If the accuracy of the new defect prediction model is less than the accuracy of the first defect prediction model, then the defect prediction system 210 continues using the first defect prediction model. In certain embodiments, the defect prediction system 210 uses the information used when generating the second defect model when generating a third defect prediction model (Model 3), and so on.

Figure 6:
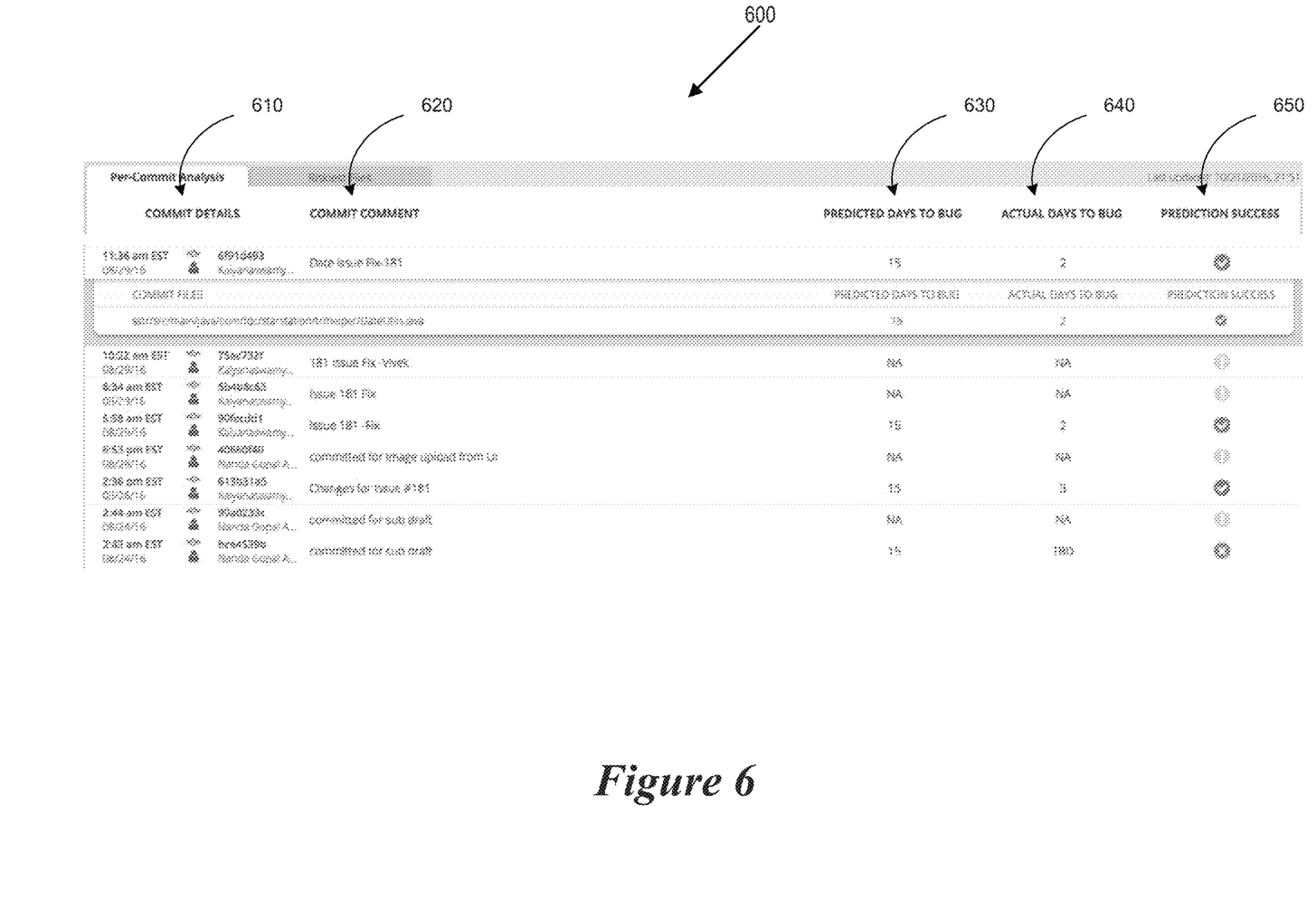
FIG. 6 shows an example screen presentation of a per commit analysis user interface.

Referring to FIG. 6, an example screen presentation of a per commit analysis user interface 600 is shown. The per commit analysis user interface includes a commit detail portion 610, a commit comment portion 620, a prediction portion 630, an actual defect portion 640 and a prediction success portion 650. More specifically, the commit detail portion 610 provides commit information for a particular file. The commit comment portion 620 comment information for a particular file. The prediction portion 630 provides the defect prediction metric corresponding to a particular file. The actual defect portion 640 provides information regarding whether a defect actually occurred for a particular file. This information may be not applicable (i.e., a defect did not occur) as well as to be determined (TBD) (i.e., a defect is yet to occur) for a particular file. The prediction success portion 650 provides an indication of whether the defect prediction metric was accurate. In certain embodiments, the defect prediction metric is accurate if a defect is in fact detected within the time predicted. The defect prediction metric is not accurate if a defect is not detected within the time predicted. Thus, using the bce4539b files as an example, if the actual defect portion extends beyond the days indicated by the defect prediction metric then the defect prediction was unsuccessful for that file.

Figure 7:
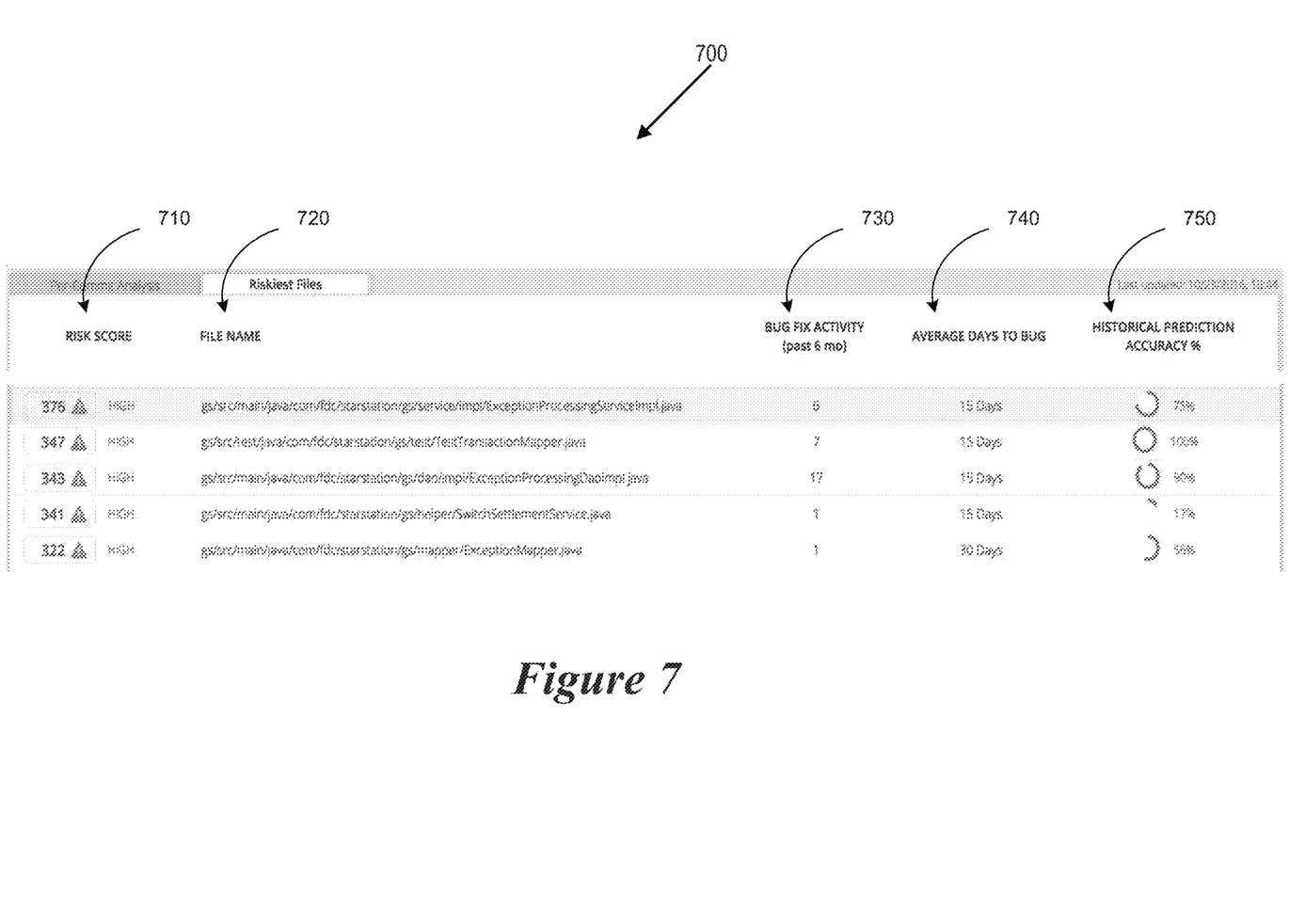
FIG. 7 shows an example screen presentation of risky files user interface.

Referring to FIG. 7, an example screen presentation of risky files user interface 700 is shown. The risky files user interface includes a risk score portion 710, a file name portion 720, a defect fix activity portion 730, an average defect portion 740 and an accuracy portion 750. More specifically, the risk score portion 710 provides the risk score for a particular file. The file name portion 720 provides the files name and storage location for a particular file. The defect fix activity portion 730 provides information regarding how many defects have been addressed within a particular file for a predetermined amount of time (e.g., 6 months). The average defect portion 740 provides information regarding an average amount of time that a defect was identified for a particular file. The accuracy portion 750 provides information regarding the accuracy of the risk score with respect to the information relating to actual defect fix activity and the average defect information. In certain embodiments, the accuracy portion provides a percentage relating to how many defects occurred within the predicted amount of time.

The present invention may be a system, a method, and/or a computer program product such that selected embodiments include software that performs certain tasks. The software discussed herein may include script, batch, or other executable files. The software may be stored on a machine-readable or computer-readable storage medium, and is otherwise available to direct the operation of the computer system as described herein and claimed below. In one embodiment, the software uses a local or database memory to implement the data transformation and data structures so as to automatically detect library substitution opportunities, improve the quality and robustness of software, educate developers about library opportunities and implementation and generate more readable, reliable, smaller, and robust code with less effort. The local or database memory used for storing firmware or hardware modules in accordance with an embodiment of the invention may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

In addition, selected aspects of the present invention may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present invention may take the form of computer program product embodied in a computer readable storage medium or media having computer readable program instructions thereon for causing a processor to carry out aspects of the present invention. Thus embodied, the disclosed system, a method, and/or a computer program product is operative to improve the design, functionality and performance of software programs by automatically detecting and recommending library function substitutions for replacing validated code snippets in the software program.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Visual Basic.net, Ruby, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system described above is for purposes of example only, and may be implemented in any type of computer system or programming or processing environment, or in a computer program, alone or in conjunction with hardware. Various embodiments of the present may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. The system and method for generating library suggestions may be implemented in any type of computer system or programming or processing environment. It is contemplated that the system and method for generating library function recommendations might be run on a stand-alone computer system, such as the one described above. The system and method for generating library suggestions might also be run from a server computer systems system that can be accessed by a plurality of client computer systems interconnected over an intranet network. Finally, the system and method for generating library suggestions projects may be run from a server computer system that is accessible to clients over the Internet.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-implementable method for predicting a defect within a computer program and applying a defect prediction, the method comprising:
   accessing a code base of the computer program, the code base of the computer program comprising a plurality of computer program files;
   training a defect prediction system, the training including performing a historical analysis of defect occurrence patterns in the code base of the computer program;
   analyzing a commit of the computer program to identify a risk value representing a likelihood of defect occurrence within each of the plurality of computer program files;
   calculating a defect prediction metric for each of the plurality of computer program files, the defect prediction metric providing an objective measure of defect prediction for each of the plurality of computer program files, wherein calculating the defect prediction metric comprises:
      correlating the risk value with a time at which the defect occurrence is likely to appear with an exponential decay function to generate the defect prediction metric, wherein the risk value is a value within a range of risk values, a low risk value is at least 10 times lower than a high risk value, each of the risk values is calculated using the decay function and based on a commit time of each computer program, each of the risk values is linked to one of a set of particular times of a next defect of the computer program associated with the risk value, and the linkage of each of the risk values to the particular times correlates to the decay function; and
   providing the defect prediction metric for use in mitigating risk associated with the defect predictions for the computer program.

2. The method of claim 1, further comprising:
   preparing the defect prediction system to perform a defect prediction operation to predict the defect within the computer program, the preparing constructs a commit history of the computer program.

3. The method of claim 1, wherein:
   verifying the defect prediction metric for each of the plurality of computer program files, comprising:
      accessing information from a plurality of previous commits of the computer program and comparing this information to the defect prediction metric for each of the plurality of computer program files to determine an accuracy of the defect prediction metric; and
   using the accuracy to further train the defect prediction system.

4. The method of claim 1, wherein:
   the defect prediction metric defect prediction includes a metric which provides an indication of a predicted interval in which the next defect occurrence can be expected.

5. The method of claim 4, wherein:
   the indication of the predicted interval in which the next defect occurrence can be expected represents a number of days before a given one or more of the computer program files can expect to have a defect reported.

6. The method of claim 1, further comprising:
   presenting the defect prediction metric for each of the plurality of computer program files to a user via a defect prediction user interface, the defect prediction user interface presenting the defect prediction metrics via a defect prediction dashboard, the defect prediction dashboard presenting information regarding the computer program files at the greatest risk for defect occurrence.

7. The method of claim 1, wherein the exponential function comprises:

$$\text{Risk Value} = 100 * \Sigma_{c=1}^{n} 1/(1+e^{(-12t_c+12)})$$

wherein:
"n" represents a number of bug-fix commits for a particular repository;
$t_c$ is a normalized timestamp of a cth commit (t=0 for an earliest commit and t=1 for a latest commit); and
100 is a convenience factor.

8. The method of claim 1, wherein the exponential function comprises a Risk Values that comprises a function of $$\Sigma_{c=1}^{n} 1/(1+e^{(-Xt_c+X)})$$

wherein:
"n" represents a number of bug-fix commits for a particular repository;
$t_c$ is a normalized timestamp of a cth commit (t=0 for an earliest commit and t=1 for a latest commit); and
X is a decay factor.

9. A system comprising:
a processor;
a data bus coupled to the processor; and
a non-transitory, computer-readable storage medium embodying computer program code,
   the non-transitory, computer-readable storage medium being coupled to the data bus, the computer program code interacting with a plurality of computer operations and comprising instructions executable by the processor and configured for:
accessing a code base of a computer program, the code base of the computer program comprising a plurality of computer program files;
training a defect prediction system, the training including performing a historical analysis of defect occurrence patterns in the code base of the computer program;
analyzing a commit of the computer program to identify a likelihood of defect occurrence within each of the plurality of computer program files; and
calculating a defect prediction metric for each of the plurality of computer program files, the defect prediction metric providing an objective measure of defect prediction for each of the plurality of computer program files, wherein calculating the defect prediction metric comprises:
  correlating the risk value with a time at which the defect occurrence is likely to appear with an exponential decay function to generate the defect prediction metric, wherein the risk value is a value within a range of risk values, a low risk value is at least 10 times lower than a high risk value, each of the risk values is calculated using the decay function and based on a commit time of each computer program, each of the risk values is linked to one of a set of particular times of a next defect of the computer program associated with the risk value, and the linkage of each of the risk values to the particular times correlates to the decay function; and
  providing the defect prediction metric for use in mitigating risk associated with the defect predictions for the computer program.

10. The system of claim 9, wherein the instructions are further configured for:
  preparing the defect prediction system to perform a defect prediction operation to predict the defect within the computer program, the preparing constructs a commit history of the computer program.

11. The system of claim 9, wherein the instructions are further configured for:
  verifying the defect prediction metric for each of the plurality of computer program files, comprising:
    accessing information from a plurality of previous commits of the computer program and comparing this information to the defect prediction metric for each of the plurality of computer program files to determine an accuracy of the defect prediction metric; and
  using the accuracy to further train the defect prediction system.

12. The system of claim 9, wherein:
  the defect prediction metric defect prediction includes a metric which provides an indication of a predicted interval in which the next defect occurrence can be expected.

13. The system of claim 12, wherein:
  the indication of the predicted interval in which the next defect occurrence can be expected represents a number of days before a given one or more of the computer program files can expect to have a defect reported.

14. The system of claim 9, wherein the instructions are further configured for:
  presenting the defect prediction metric for each of the plurality of computer program files to a user via a defect prediction user interface, the defect prediction user interface presenting the defect prediction metrics via a defect prediction dashboard, the defect prediction dashboard presenting information regarding the computer program files at the greatest risk for defect occurrence.

15. The system of claim 9, wherein the exponential function comprises:

$$\text{Risk Value} = 100 * \Sigma_{c=1}^{n} 1/(1+e^{(-12t_c+12)})$$

wherein:
  "n" represents a number of bug-fix commits for a particular repository;
  tc is a normalized timestamp of a cth commit (t=0 for an earliest commit and t=1 for a latest commit); and
  100 is a convenience factor.

16. The system of claim 9, wherein the exponential function comprises a Risk Values that comprises a function of $$\Sigma_{c=1}^{n} 1/(1+e^{(-Xt_c+X)})$$

wherein:
  "n" represents a number of bug-fix commits for a particular repository;
  tc is a normalized timestamp of a cth commit (t=0 for an earliest commit and t=1 for a latest commit); and
  X is a decay factor.

17. A non-transitory, computer-readable storage medium embodying computer program code, the computer program code comprising computer executable instructions configured for:
  accessing a code base of a computer program, the code base of the computer program comprising a plurality of computer program files;
  training a defect prediction system, the training including performing a historical analysis of defect occurrence patterns in the code base of the computer program;
  analyzing a commit of the computer program to identify a likelihood of defect occurrence within each of the plurality of computer program files; and
  calculating a defect prediction metric for each of the plurality of computer program files, the defect prediction metric providing an objective measure of defect prediction for each of the plurality of computer program files, wherein calculating the defect prediction metric comprises:
    correlating the risk value with a time at which the defect occurrence is likely to appear with an exponential decay function to generate the defect prediction metric, wherein the risk value is a value within a range of risk values, a low risk value is at least 10 times lower than a high risk value, each of the risk values is calculated using the decay function and based on a commit time of each computer program, each of the risk values is linked to one of a set of particular times of a next defect of the computer program associated with the risk value, and the linkage of each of the risk values to the particular times correlates to the decay function; and
  providing the defect prediction metric for use in mitigating risk associated with the defect predictions for the computer program.

18. The non-transitory, computer-readable storage medium of claim 17, wherein the instructions are further configured for:
  preparing the defect prediction system to perform a defect prediction operation to predict the defect within the computer program, the preparing constructs a commit history of the computer program.

19. The non-transitory, computer-readable storage medium of claim 17, wherein the instructions are further configured for:
  verifying the defect prediction metric for each of the plurality of computer program files, comprising:
    the verifying accessing information from a plurality of previous commits of the computer program and comparing this information to the defect prediction metric for each of the plurality of computer program files to determine an accuracy of the defect prediction metric; and
  using the accuracy to further train the defect prediction system.

20. The non-transitory, computer-readable storage medium of claim 17, wherein:
the defect prediction metric defect prediction includes a metric which provides an indication of a predicted interval in which the next defect occurrence can be expected.

21. The non-transitory, computer-readable storage medium of claim 20, wherein:
the indication of the predicted interval in which the next defect occurrence can be expected represents a number of days before a given one or more of the computer program files can expect to have a defect reported.

22. The non-transitory, computer-readable storage medium of claim 17, wherein the instructions are further configured for:
presenting the defect prediction metric for each of the plurality of computer program files to a user via a defect prediction user interface, the defect prediction user interface presenting the defect prediction metrics via a defect prediction dashboard, the defect prediction dashboard presenting information regarding the computer program files at the greatest risk for defect occurrence.

23. The non-transitory, computer-readable storage medium of claim 17, wherein the exponential function comprises:

$$\text{Risk Value} = 100 * \Sigma_{c=1}^{n} 1/(1+e^{(-12t_c+12)})$$

wherein:
"n" represents a number of bug-fix commits for a particular repository;
tc is a normalized timestamp of a cth commit (t=0 for an earliest commit and t=1 for a latest commit); and
100 is a convenience factor.

24. The non-transitory, computer-readable storage medium of claim 17, wherein the exponential function comprises a Risk Values that comprises a function of $$\Sigma_{c=1}^{n} 1/(1+e^{(-Xt_c+X)})$$

wherein:
"n" represents a number of bug-fix commits for a particular repository;
tc is a normalized timestamp of a cth commit (t=0 for an earliest commit and t=1 for a latest commit); and
X is a decay factor.

* * * * *